Oct. 7, 1930.　　　　G. W. ALDEEN　　　　1,777,286
MORTISING MACHINE
Filed Jan. 7, 1929　　　　5 Sheets-Sheet 1

Fig. 1

Inventor
Gedor W. Aldeen
By Churchill Parker & Carlson
Attys

Oct. 7, 1930.　　　G. W. ALDEEN　　　1,777,286
MORTISING MACHINE
Filed Jan. 7, 1929　　　5 Sheets-Sheet 2

Oct. 7, 1930.  G. W. ALDEEN  1,777,286
MORTISING MACHINE
Filed Jan. 7, 1929   5 Sheets-Sheet 5

Inventor
Gedor W. Aldeen
By Chindahl Parker Carlson
Attys

Patented Oct. 7, 1930

1,777,286

UNITED STATES PATENT OFFICE

GEDOR W. ALDEEN, OF ROCKFORD, ILLINOIS

MORTISING MACHINE

Application filed January 7, 1929. Serial No. 330,801.

This invention relates to mortising machines and more particularly to those for cutting the pulley-mortises in window stiles.

The primary object is to provide a fully automatic mortising machine in which the window stiles with the groove for the parting strip cut are placed in a hopper on the machine and from which the stiles are discharged with the pulley-mortises completely cut.

Another object of the invention is to provide a fully automatic mortising machine in which a plurality of pulley-mortises in a window stile may be cut simultaneously.

A further object of the invention is to provide a fully automatic mortising machine in which different types of pulley-mortises may be cut in window stiles merely by changing the cam control means of the machine and the cutters.

A still further object is to provide a fully automatic mortising machine in which the power required for cutting remains substantially constant throughout the cut.

Another object is to provide a fully automatic mortising machine in which the piece being cut is yieldingly held against the vertical feeding action of the cutters whereby the relative movement of the cutters into the piece may be temporarily decreased if pressure of the cutters against the piece becomes excessive.

Another object is to provide a fully automatic mortising machine in which adjustment is provided to accommodate both right and left hand window frame stiles.

Still another object is to provide a fully automatic mortising machine in which adjustment is provided to accommodate window frame stiles having different lengths, widths, or spacing of pulley-mortises.

Another object is to provide a novel method of cutting mortises having a shallow portion and a deeper portion of less width and length than said shallow portion.

Other objects and advantages of the invention will become apparent from the following detailed description taken in connection with the accompanying drawings, in which.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

*Brief description of machine as a whole*

A brief explanation of the general construction and operation of the machine will facilitate an understanding of the more detailed description to follow.

The machine comprises generally a hollow base casting which is provided at the back with a vertical standard on which are mounted arms, extending forwardly and arranged to be reciprocated vertically and horizontally, for supporting vertical cutter spindles. Immediately below these spindles is a clamping means for clamping the window stiles while being cut.

In front of the spindles is a hopper for holding the uncut window stiles and from which the bottom stile is pushed by a stock-feeding mechanism rearwardly into the cutting position.

In back of the spindles is a gravity actuated discharging device. As each stile is advanced to the cutting position it pushes the previously cut stile onto the discharging device which permits it to roll off to one side of the machine.

To the rear of the vertical standard is mounted a motor having a vertical shaft. On the upper end of the motor shaft above the motor a drive pulley is mounted and from this belts run forward to pulleys on the upper ends of the cutter spindles.

Below the motor a step pulley for driving all feed mechanisms is mounted on the shaft and connected by a belt to a corresponding pulley on a vertical shaft. On the upper end of this shaft there is a worm driving a wheel on a horizontal shaft at the side of the base, and extending part way forward. The front end of this horizontal shaft carries an eccentric for reciprocating the spindles from side to side. On this same shaft a pinion is mounted driving a gear on the main feed shaft which is below the first horizontal shaft and extends from front to rear of the machine.

On the main feed shaft are located cams for actuating the various parts of the machine. Starting at the front end of this shaft, the first cam actuates the stock-feeding mechanism, the second cam the clamping means, the third cam, in conjunction with the eccentric previously mentioned, the horizontal feeding mechanism, and the fourth cam the vertical feeding mechanism.

By having all these cams on one shaft the various steps in the operation of the machine and the feeds are held in accurate timed relation to each other.

Detailed description

Referring now more particularly to the specific construction of the exemplary embodiment of the invention, the machine comprises a hollow base casting 20 having a widened front portion 21 and extending at its rear into a vertical standard 22. On each side of vertical standard 22 arms 23 are mounted and extend forwardly therefrom to support parts of a hopper later to be described. The vertical standard on its front face is provided with vertical dovetail guiding means 24 for supporting a head 25 and vertical feeding means for the head 25 are contained within the vertical standard 22.

The head 25 carries a support 26 on which cutting spindles are mounted and a horizontal dovetail guiding means 27 therebetween is provided. Means for feeding the support 26 horizontally along the guiding means 27 will later be described.

Support 26 at its front end carries vertical cutting spindles and adjustment is provided between them to permit of different spacing of pulley-mortises. In the present instance two such spindles 30 and 31 are shown, one in front of the other. The spindle 30 is mounted directly on the support 26 and is journaled at its lower end in a bearing 32 in the support 26 and at its upper end in a bearing 33 carried by an arm 34 extending up from the support 26. Spindle 31 is mounted so that its position is adjustable relative to spindle 30. From the left side of support 26 an arm 35 extends forward and to the side and carries a pivot pin 36 at its front end on which is pivoted an arm 37. The spindle 31 is journaled in bearings 40 and 41 in arm 37.

Means for holding spindle 31 in an adjusted position is provided on arm 37 in the following manner. Two ears 42 extend to the right of arm 37 and carry a vertical pin 43 which has a hole through it at its midpoint. Passing through the hole is a threaded pin 44, one end of which is pivoted at 45 on a lug 46 extending from support 26. Two knurled nuts 47 threaded on pin 44 are clamped against pin 43.

The spindles 30 and 31 at their lower ends are internally threaded to receive the stems of cutters 50 and at their upper ends pulleys 51 are mounted.

Driving means

Means for driving the various parts of the machine comprises an electric motor 52 mounted on the back of the vertical standard 22 by means of brackets 53. On the upper end of its shaft a pulley 54 is mounted for driving the spindle pulleys 51 through the belts 55.

A belt tightener is mounted on the top of vertical standard 22 for keeping the belts 55 under the proper tension. In the present instance the tightener comprises a frame 56 pivoted on pin 57 extending upward from the standard 22. A roller 60 is supported by frame 56 and engages belts 55. A torsion spring 61 holds the roller 60 against the belts 55 with sufficient force to place the belts under tension.

The lower end of the shaft of motor 52 has a step pulley 62 for driving the vertical and horizontal feeding mechanism of the cutter spindles, the stock feeding means, and the clamping means. Pulley 62 is connected by a belt 63 to a corresponding step pulley 64 mounted on a vertical countershaft 65. A worm is mounted on countershaft 65 in casing 66 and the worm drives a worm wheel in casing 67 and on a shaft contained therein. The forward end of this shaft carries an eccentric 70 and a short distance back of the eccentric is a pinion 71 on the shaft.

Below the last-mentioned shaft and extending from front to rear of the machine is a shaft 72 on which are mounted cam means for driving various parts of the machine. The shaft 72 carries a gear 73 meshing with the pinion 71 and is driven thereby, the shaft 72 being journaled in bearings 74 and 75 supported by the base casting 20.

Vertical feeding mechanism of the cutter

In the embodiment herein shown, relative motion between the cutters and the stock is accomplished by clamping the stock in a stationary position and feeding the cutters horizontally and vertically. As mentioned above, dovetail guiding means 24 and 27 are provided to permit of such feeding of the cutters.

Figure 3:
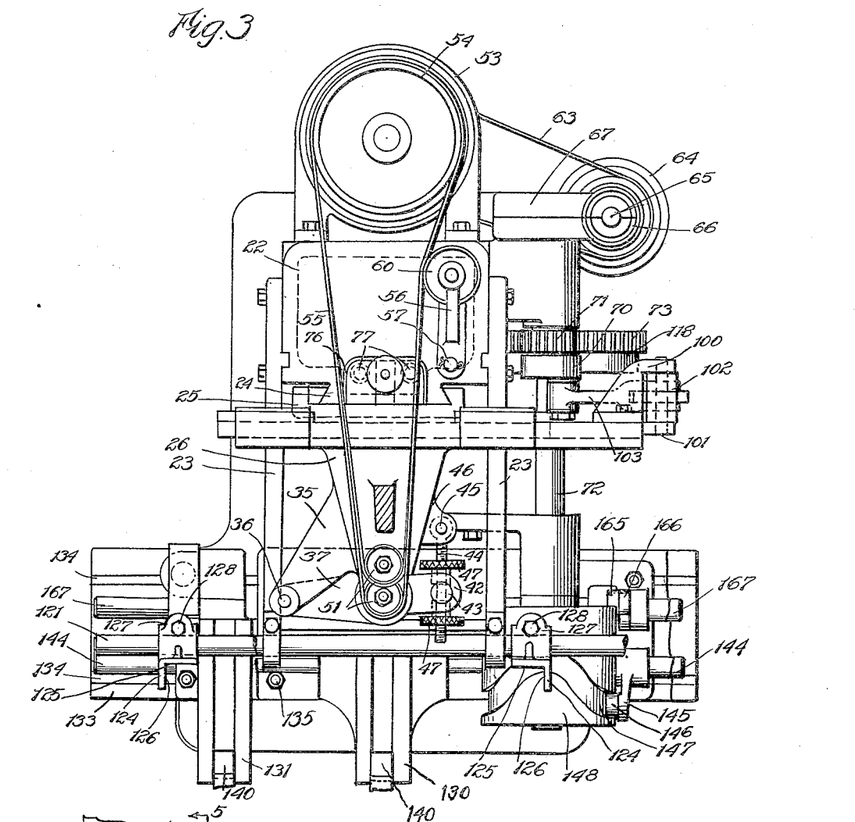
Fig. 3 is a plan view of the machine.

The mechanism employed for causing the vertical feed will first be described. Projecting to the rear of the head 25 (Figs. 3 and 6) and at the top middle portion thereof is a lip 76 having two holes therein through which guide rods 77 pass. The rods 77 are rigidly attached to the inside of the vertical standard 22 by means of lugs 80 projecting from the inside of the front wall of the standard 22. Surrounding the guide rods 77 and bearing on the lugs 80 at one end and the lip 76 at the other are compression springs 81 tending to force the lip 76, and hence the head 25 upward in the vertical dovetail guiding means 24.

The center portion of the lip 76 is formed to provide a socket 82 representing a portion of a spherical cavity. A ball 83 is seated in the socket 82 and has a hole through which passes a vertical rod 84. Attached to the lower end of the rod 84 is one end of a bell crank 85 pivoted at 86 on the vertical standard 22. The other end of the bell crank 85 carries a roller 87 abutting against a vertical feed cam 90 on shaft 72.

Surrounding that portion of the rod 84 which projects above the ball 83 is a sleeve 91 abutting the ball 83 at the lower end and at its upper end, a knurled nut 92 threaded onto the rod 84. A second knurled nut 93 is threaded onto the rod 84 for locking the nut 92 in place and is spaced therefrom by a short sleeve 94.

Motion of the roller 87 on the bell crank 85 upward causes the latter to pull the rod 84 down against the action of springs 81. By changing the position of sleeve 91 on the rod 84 by means of the knurled nuts 92 and 93, the position of the ball 83 on the rod 84 may be changed and the position of the stroke of head 25 may be shifted.

Horizontal feeding mechanism of the cutter

Figure 4:
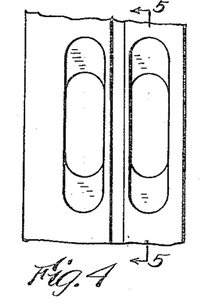
Fig. 4 is a view of a portion of a window stile showing the usual type of pulley-mortise cut therein.
Figure 5:
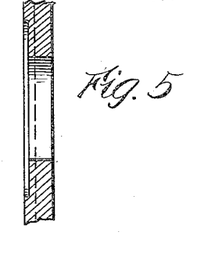
Fig. 5 is a section of a pulley-mortise taken along line 5—5 of Fig. 4.

To cut the type of pulley-mortise shown in Figs. 4 and 5, a standard straight shank type of cutter is used. This necessitates giving the cutter a longer horizontal feed for cutting the flange-receiving portion of the pulley-mortise than is required to cut the body-receiving portion. To accomplish this, two actuating means are employed both of which operate during the cutting of the flange-receiving portion, and one of which remains idle during the cutting of the body-receiving portion. Figs. 8, 9, 10 and 11 illustrate this portion of the machine most clearly.

The particular embodiment of the horizontal feeding mechanism employed herein comprises a lug 100 extending from the right side of the support 26 and rigidly attached thereto. Pivoted to the lug 100 by means of pin 101 is a lever 102. A link 103 is pivotally attached at one of its ends to lever 102 by a pin 104, and the other end of the link is adjustably attached to the eccentric 70 by a nut and bolt 105 whose head 106 slides in a T-slot in the eccentric 70. In the lower end of lever 102 is a slot 107 arranged to receive a pin 110 to which a link 111 is attached at one of its ends. The other end of link 111 is attached to a similar pin 112 working in a similar slot 113 of a second lever 114. This second lever is pivoted on the base casting 20 by a pin 115 and carries a roller 116 seated in a cam slot 117 on the front face of a cam disk 118 which is keyed to shaft 72 immediately in front of gear 73.

Gear 73 and pinion 71 are related to each other in a four to one ratio so that eccentric 70 makes four complete cycles to each one of the cam disk 118. While the eccentric 70 makes its first cycle during the cutting of a pulley-mortise, the portion of the cam disk 118 imparting motion to its roller 116 is in an operating position, and the requisite amount of feed is imparted to the cutters to cut the flange-receiving portion of the pulley-mortise. While the body-receiving portion is being cut, the eccentric 70 continues in operation but the dwell portion of the cam disk 118 is in contact with the roller 116 and no motion is imparted to the mechanism from the cam disk 118.

Figure 15:
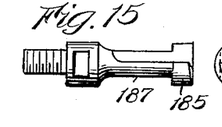
Fig. 15 is a side view of the type of cutter used to cut a pulley-mortise as shown in Fig. 13.
Figure 16:
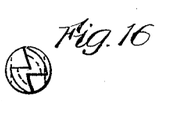
Fig. 16 is an end view of the cutting end of the cutter shown in Fig. 15.

When cutters of type shown in Figs. 15 and 16 are used and it is desired to cut pulley-mortises of the type shown in Figs. 13 and 14, it is necessary to change the horizontal feeding mechanism in the following respects. The bolt 105 is moved to the center of the eccentric 70 so that the latter imparts no motion whatever to the mechanism.

Figures 13, 14:
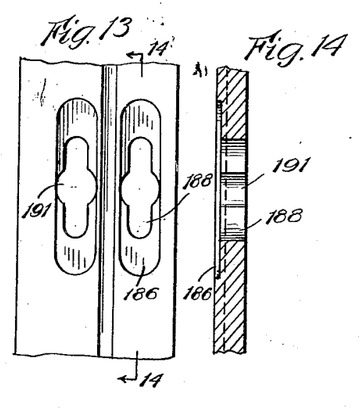
Fig. 13 is a view of a portion of a window stile showing a novel type of pulley-mortise.
Fig. 14 is a sectional view of the pulley-mortise shown in Fig. 13 and taken along the line 14—14 in Fig. 13.

A different cam disk 120 is substituted for the cam disk 118 and is so designed that it imparts the entire motion to the mechanism for cutting the complete pulley-mortise, shown in Figs. 13 and 14.

Stock feeding mechanism

To feed the stock to the cutting position, it is placed in a hopper and from there taken automatically to the cutters. As stated above, arms 23 extend forwardly, one on each side of the cutters and support a rod 121 extending across the front of the machine as shown in Figs. 1, 2, 3 and 7. The arms 23 are split at 122 and a screw 123 is inserted through the two portions so formed in order that the rod 121 may be rigidly clamped to the arms 23.

Figure 1:
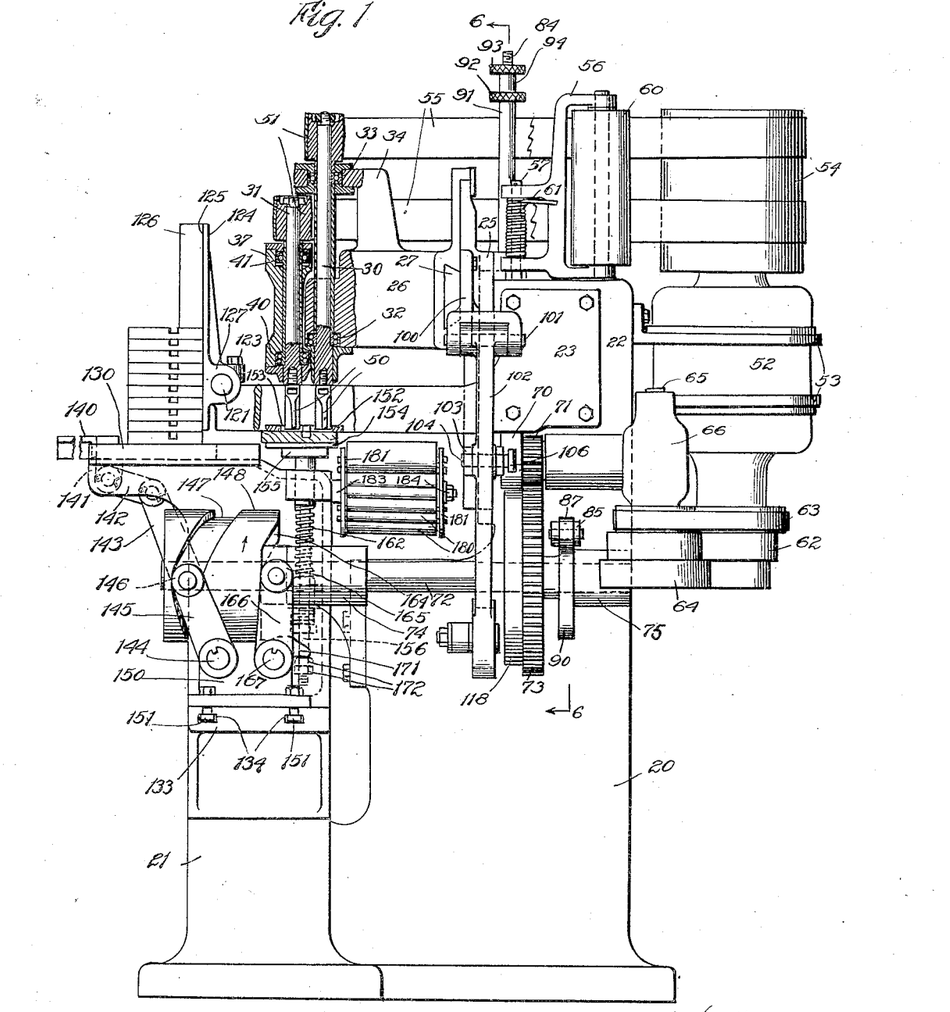
Figure 1 is a side elevation of a machine embodying the features of my invention with a portion cut away to show the cutters more clearly.

The hopper is formed by two vertical guide bars 124 mounted on the rod 121 and presenting two guide faces 125 and 126 against which the side and end edges of the stock are placed, the stock being piled cross-wise of the machine as shown in Fig. 1. The guide bars 124 are provided with split lugs 127 having a hole through which the rod 121 passes, and having screws 128 for drawing the two portions of the lugs 127 together to clamp the rod 121 and hold the guide bars 124 in a rigid position. To accommodate window stiles of different sizes and also right and left hand stiles, the guide bars 124 may be unclamped and moved along the rod 121 and reclamped in the proper position.

The bottom of the hopper on which the stock rests comprises two work supports 130 and 131. The work support 130 is centrally located and has an underframe 132 resting on a table 133 which forms the upper part of the front portion 21 of the base casting 20. T-slots 134 are cut in the table 133 and the underframe 132 is bolted to the table 133 by bolts 135 located in the T-slots 134. The work support 131 has an underframe 136 similarly bolted to the table 133 by bolts 137 and may be moved along the table 133 or placed on the opposite end of the table 133 to accommodate window stiles of different sizes and right and left hand stiles.

To feed the stock from the hopper, suitable means are provided for pushing the bottom piece of stock out from under the pile in the hopper and moving it rearwardly. In this connection, it is to be noted that the vertical guide bars 124 are raised above the work supports 130 and 131 slightly more than the thickness of one piece of stock so that the bottom piece in being moved rearwardly will pass under the vertical guide bars 124.

The means provided for pushing the bottom piece of stock comprises pusher bars 140 dovetailed into the work supports 130 and 131 and arranged for reciprocation therein. Pusher bars 140 are of sufficient length to support the pile of stock when they are in the extreme rear position. Attached to lugs 141 formed on the bottom of the pusher bars 140 are links 142 which are in turn attached to levers 143. Extending across the machine is a rock shaft 144 journaled in the underframes 132 and 136, and on this shaft 144 the levers 143 are keyed. On the right side of the machine a lever 145 is keyed onto the rock shaft 144 and carries at its upper end a roller 146 seated in a cam groove 147 formed in the periphery of a cam cylinder 148 on the front end of shaft 72. It is apparent that, as the cam cylinder 148 is rotated, the shaft 144 is rocked through the roller 146 and the lever 145, and the pusher bars 140 are reciprocated in the work supports 130 through the levers 143 and links 142. Rock shaft 144 is also journaled in a block 150 bolted to the table 133 by bolts 151 and forming a means for holding the lever 145 in the proper position on the shaft 144.

Work clamping means

After a piece of stock has been pushed from the hopper into a cutting position, it becomes necessary to clamp it in such position while the pulley-mortises are being cut. The particular means employed in this machine is most clearly shown in Figs. 1, 2 and 7 and is described as follows:

Immediately adjacent the cutters is a stationary plate 152 rigidly attached to the under side of arms 23 and bridging the space between them. A hole 153 is formed in the plate 152 to permit the cutters 50 to enter the work. Below the stationary plate 152 is a movable plate 154 of substantially the same size as the stationary plate 152 and which is capable of being moved upwardly to clamp the piece of stock against the stationary plate 152. Two blocks 155 are located under the movable plate 154, one at each end of the latter, and form the upper ends of rods 156 which are supported for vertical sliding movement in lugs 157 extending from the sides of the underframe 132. Farther down the rods 156 are sleeves 160 threaded into lugs 161 extending from the sides of the underframe 132. Compression springs 162 surround the rods and bear at one end on the sleeves 160 and at the other end against enlarged portions 163 of the rods 156 tending to force the rods upwardly. The force exerted by the springs 162 may be varied by screwing the sleeves 160 in the lugs 161.

To move the rods 156 downwardly against the action of the springs 162, cam actuated means are employed. On the rear face of cam cylinder 148 a cam surface 164 is formed and a roller 165 on the upper end of a lever 166 rolls against it. The lower end of the lever 166 is keyed to a rock shaft 167 extending across the machine and journaled in underframes 132 and 136 and the block 150. Blocks 170 are keyed to the shaft 167 immediately adjacent the rods 156 and have fingers 171 extending rearwardly and to one side of the rods 156. Two nuts 172 are threaded onto each rod 156 near the lower end of the latter, the lower nut locking the other in place on the rod 156 in such position that the finger 171 abuts against the upper surface of the upper nut. When the cam surface 164 moves the roller 165 to the rear, the shaft 167 is rocked and fingers 171 press down on the nuts 172 causing the rods 156 to be pulled down against the action of the springs 162.

From this description of the work clamping means, it is apparent that the springs 162 tend to hold the plate 154 in clamping position and that the action of the cam surface 164 causes the plate 154 to be withdrawn from clamping position.

At one side of the machine, depending on whether pulley-mortises are being cut in right or left hand window frame stiles, a device similar in character to the clamping means is employed with the exception that no stationary plate above the movable plate is used. The function of this device is to support the projecting end of the piece of stock farthest from the center.

Figure 2:
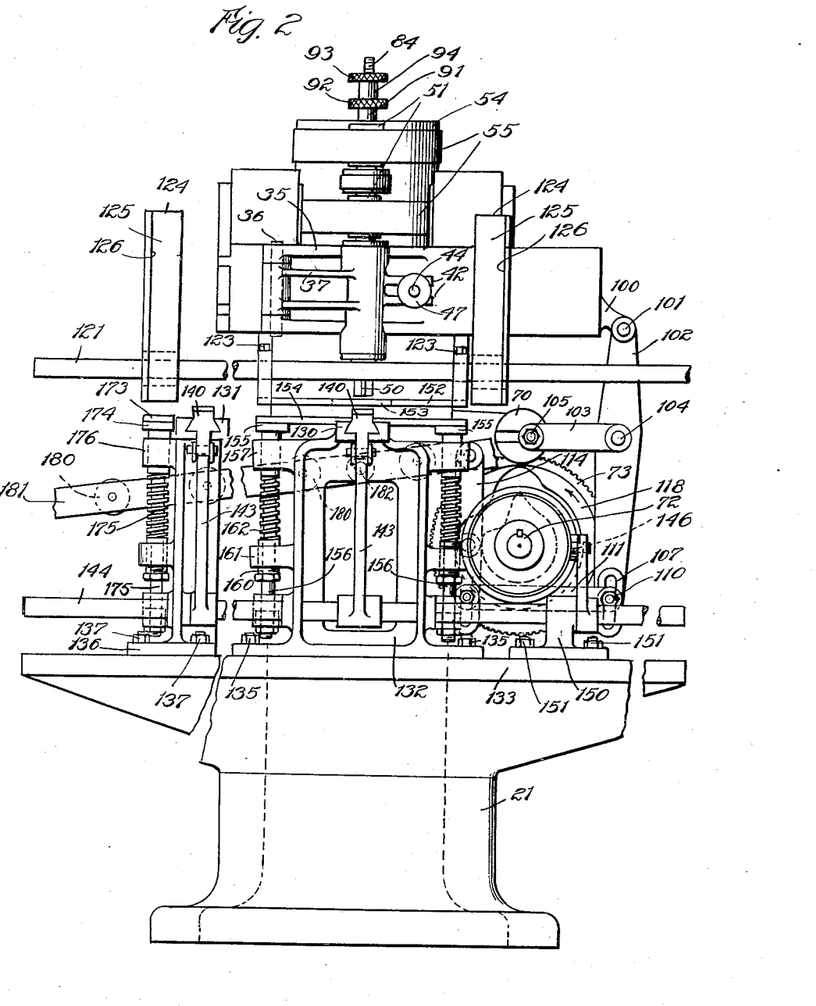
Fig. 2 is a front elevation of the machine.

In the present instance, as shown in Fig. 2, this device is located on the left side of the machine and comprises a movable plate 173 seated on a block 174 forming the end of a rod 175. The latter is supported for vertical sliding movement in a lug 176 extending from the side of underframe 136 and is moved in exactly the same way that rods 156 are moved.

Discharging means

As the movable plate 154 means downward and unclamps the piece of stock, the latter is pushed to the rear by the next piece of stock being pushed into the clamping position by the pusher bars 140. To carry the finished piece out of the machine, a discharging means is provided which is located immediately to the rear of the clamping means and carries the piece out to one side of the machine.

Any suitable type of discharging means may be employed, the particular type shown in the drawings being actuated by gravity and comprising a series of rollers 180 supported in side frames 181. The latter are pivotally attached to the rear side of underframe 132 by a bolt 182 running through a boss 183 formed in the underframe 132. A nut 184 is threaded onto the outer end of the bolt 182 to clamp the side frames 181 against the boss 183 to hold the side frames 181 in any desired position.

When the machine is arranged, as shown in Fig. 2, to take window frame stiles projecting to the left side of the machine, the discharging means is tilted downward to the left so that the finished piece of stock when it is pushed out of the clamping means rolls out to the left side of the machine. When the machine is arranged for stiles projecting to the right side of the machine, the discharging means is tilted downward to the right and clamped so that the finished pieces then roll out of the right side of the machine.

Operation

In Figs. 4 and 5, the usual type of pulley-mortise is shown and Figs. 1 to 11 inclusive are illustrative of the machine arranged to cut this type of pulley-mortise. It is to be understood, however, that the machine is capable of cutting other types of pulley-mortises with only slight changes in the arrangement of some of the parts of the machine. For instance, to cut pulley-mortises as shown in Figs. 13 and 14 by means of cutters shown in Figs. 15 and 16, it is only necessary to substitute the cam disk 120 shown in Fig. 12 for the cam disk 118, move the bolt 105 to a central position on eccentric 70, and also substitute another cam in place of cam 90 to give a slightly different vertical feed.

The operation of the machine in cutting the usual type of pulley-mortise shown in Figs. 4 and 5 may be described as follows:

The operator places a pile of stock in the hopper, as shown in Fig. 1, with the rear and end edges abutting against the guide faces 125 and 126 of the vertical guide bars 124. By the action of cam groove 147, pusher bars 140 push the bottom piece rearwardly out from under the pile and onto the movable clamping plate 154.

When the piece has been so placed, cam surface 164 recedes to the left as shown in Fig. 1 and permits the fingers 171 to release their downward pressure on the nuts 172 on the lower ends of rods 156. The springs 162 then force the rods 156 upward and cause the movable plate 154 to clamp the piece against stationary plate 152.

Figure 6:
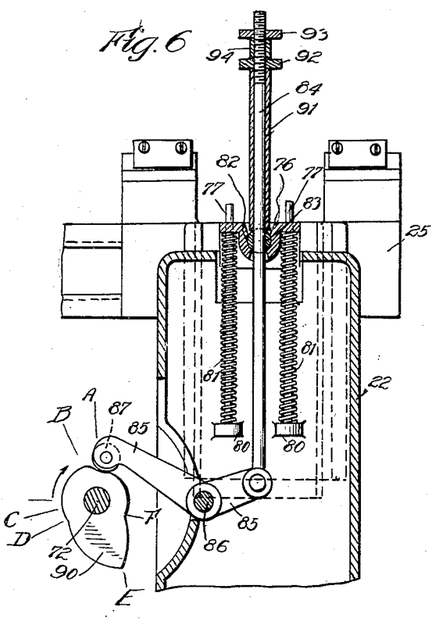
Fig. 6 is a fragmentary sectional view of the vertical feeding mechanism taken along the line 6—6 of Fig. 1.
Figure 7:
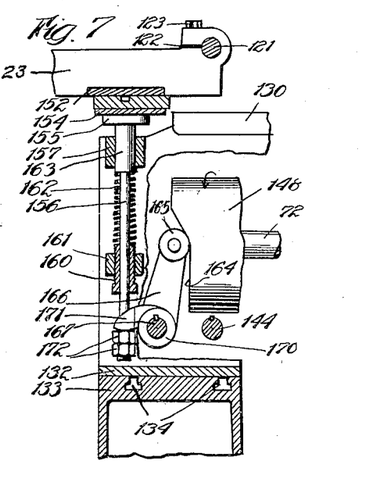
Fig. 7 is a fragmentary sectional view of the clamping means.
Figures 8, 9:
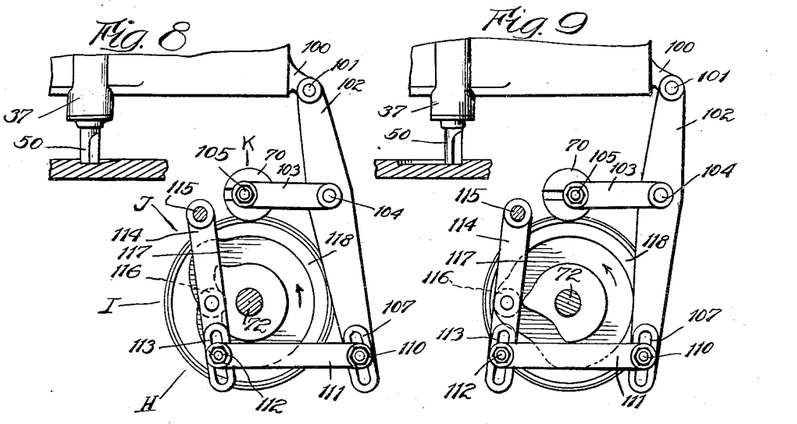
Figs. 8, 9, 10 and 11 are fragmentary views of the horizontal feeding mechanism showing various positions of the feeding mechanism and the corresponding positions of the cutters in their relation to the work.

At this point, cam 90 forces the roller 87 upward, as shown in Fig. 6, and by means of the bell crank 85 and the rod 84, the head 25, as well as the support 26, spindles 30 and 31 and cutters 50 are fed downward toward the piece of stock. In doing this the point of contact of the roller 87 on the cam 90 has moved from A to B. While this has been happening, the point of contact between roller 116 and cam slot 117 has moved from H to I, the eccentric 70 has moved the bolt 105 from its lowest position to the position shown in Fig. 8 and the cut shown therein has been produced. While cam 90 moves from B to C producing a zero vertical feed, cam slot 117 has moved from I to J and the eccentric 70 has moved the bolt 105 from the extreme left position to the extreme right position. In so doing, the flange-receiving portion of the pulley-mortise is cut, as shown in Fig. 9.

Figure 10:
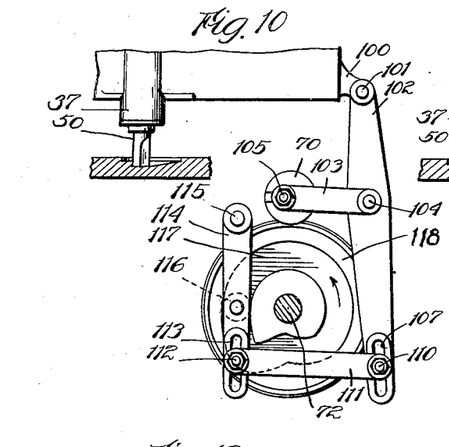
Figure 11:
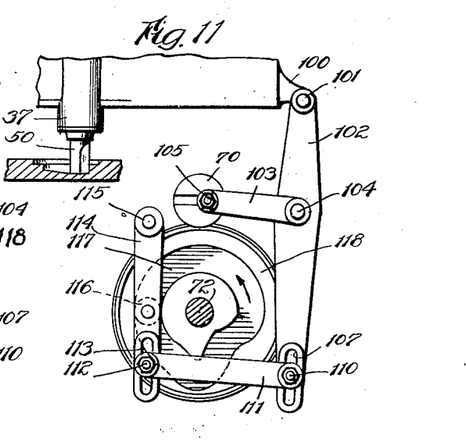
Figure 12:
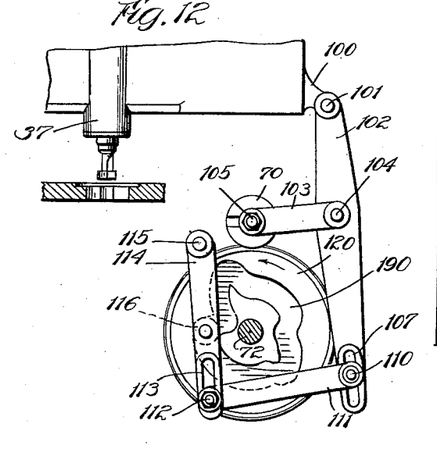
Fig. 12 is a fragmentary view of the horizontal feeding mechanism used when pulley-mortises of the type shown in Figs. 13 and 14 are to be cut.

In cutting the body-receiving portion, cam 90 first moves from C to D with a zero vertical feed and then starts on the portion D to E, while cam slot 117 moves from J to K and bolt 105 moves back to the extreme left position. This produces the portion of the cut shown in Fig. 10. For the remainder of the body-receiving portion, cam 90 moves from D to E, cam slot 117 moves partially through the portion K to H without producing any horizontal feed, and the eccentric 70 produces the entire horizontal feed. In this way, the cutter follows a zig-zag path through the piece of stock. Figs. 10 and 11 show progressive steps in the cutting of the body-receiving portion.

By the time cam 90 has turned to the point E, the cutters are at the lowest part of their stroke and the pulley-mortise is entirely cut. Cam 90 then turns from E to F and thereby moves the cutters up out of the piece of stock. While cam 90 moves from F to A, the piece is unclamped, and a new piece is fed in and clamped.

When the finished piece has been unclamped, the new piece being pushed in by the pusher bars 140 pushes the old piece onto the discharging means and through gravity it rolls on the rollers 180 to one side of the machine.

To cut the type of pulley-mortise shown in Figs. 13 and 14, a cutter as shown in Figs. 15 and 16 is used. It comprises a head 185 having a diameter equal to the width of the flange-receiving portion 186 of the pulley-mortise and a shank 187 having a diameter equal to the width of the body-receiving portion 188.

The feeding of such a cutter is slightly different than that of the usual type previously described. The bolt 105 is set on the center of the eccentric 70 so that the latter produces no feeding motion. Cam disk 120 having a cam slot 190 is substituted for cam disk 118 and a slightly different cam (not shown) is substituted for cam 90.

The motion of such a cutter is as follows: It is first fed down at the center of the pulley-mortise to the depth of the flange-receiving portion 186, then moved to the extreme left, then to the extreme right, and back to a central position. By this movement, the head 185 of the cutter cuts the flange-receiving portion. The next step is to feed the cutter down until the head 185 has passed entirely through the piece of stock and the portion 191 has been cut. Next the cutter is fed to the right, then the left, and back to center. The extent of this motion is such as to cut the full length of the body-receiving portion and it is to be noted that this is cut by the shank 187 of the cutter so that the width of the cut is equal to the body of the pulley. The cutter is then withdrawn by a vertical movement while it is at the center of the pulley-mortise.

It is apparent from the above description that the timing of the various operations taking place in the machine is accurately controlled because of the fact that cams causing the various operations are all mounted on the one shaft 72 or on a shaft geared thereto as in the case of eccentric 70. It is also apparent that because of adjustments provided for the various parts of the machine, right or left hand window-sash stiles may be handled as well as stiles of various lengths, widths, thicknesses and spacings of pulley-mortises.

It is seen that a fully automatic mortising machine is provided in which window-stiles are placed in a hopper and are discharged with the pulley-mortises completely cut.

I claim as my invention:

1. A machine of the character described comprising, in combination, a frame, means for cutting pulley-mortises, a support carrying said cutting means, means for moving said support transversely of said cutting means, a head mounted on said frame for movement axially of said cutting means and carrying said support, and means for moving said head axially of said cutting means including springs operable to hold said head out of cutting position and cam means operable to move said head against the action of the springs whereby the cutting means is fed axially into the work.

2. In a mortising machine, the combination of a cutter, and means for feeding the cutter into the work comprising axial feeding mechanism, and transverse feeding mechanism including two actuating means each of which is capable of causing a transverse feeding movement when the other is rendered ineffective.

3. In a mortising machine, the combination of a cutter, and means for feeding the cutter into the work comprising axial feeding mechanism, and transverse feeding mechanism including two actuating means which cause a resulting movement equal to the sum of the movements caused by each of said means.

4. In a mortising machine, the combination of a cutter, and means for feeding the cutter into the work comprising axial feeding mechanism, and transverse feeding mechanism including two actuating means which cause a resulting movement equal to the sum of the movements caused by said means, and a common means for applying the resulting movement caused by said two actuating means.

5. In a mortising machine the combination of a cutter, and means for feeding the cutter into the work comprising axial feeding mechanism, and transverse feeding mechanism including two actuating means which cause a resulting movement equal to the sum of the movements caused by said means, both of said means being operable in timed relation to each other.

6. In a mortising machine, the combination of a cutter, and means for feeding the cutter into the work comprising axial feeding mechanism, and transverse feeding mechanism including an eccentric controlled actuating means, a cam controlled actuating means, and a lever to which both of said actuating means are attached. the point of attachment of one of said actuating means acting as a shifting pivot about which said lever is moved by the other of said actuating means.

7. In a mortising machine, the combination of a cutter, and means for feeding the cutter into the work comprising axial feeding mechanism, and transverse feeding mechanism including an eccentric, a cam and a lever, said eccentric and said cam being operated in timed relation to each other and imparting motion to said lever at different points thereon.

8. In a mortising machine, the combination of a cutter, and means for feeding the cutter into the work comprising vertical feeding mechanism, and horizontal feeding mechanism having a lever, an eccentric, a link connecting said eccentric to said lever, a cam, a second lever carrying a roller and actuated by said cam, and a link connecting said second lever to said first lever.

9. In a mortising machine, the combination of a cutter whose diameter is equal to the width of the mortise, and means for feeding the cutter into the work comprising axial feeding mechanism and transverse feeding mechanism including two actuating means, both of said actuating means causing feeding during the cutting of the flange-receiving portion of the mortise and only one of said actuating means causing feeding during the cutting of the body-receiving portion of the mortise.

10. In a mortising machine, the combination of a cutter whose diameter is equal to the width of the mortise, and means for feeding the cutter into the work comprising axial feeding mechanism and transverse feeding mechanism actuated by an eccentric and a cam, said eccentric causing feeding during the whole cutting operation, and said cam causing feeding only during the cutting of the flange-receiving portion of the mortise.

11. In a pulley-mortising machine, the combination of a cutter comprising a cutting head of a diameter substantially equal to the flange of the pulley and having an end cutting face, and a cutting shank of a diameter substantially equal to the body of the pulley, and means for feeding said cutter into the work comprising axial feeding mechanism and transverse feeding mechanism, said feeding means operating to cause said cutting head to cut a flange-receiving portion of a mortise by a transverse feeding movement and a shorter return movement, then advancing to cut a hole through the work by an axial feeding movement, and to cause said cutting shank to cut a body-receiving portion of a mortise by a transverse movement.

12. The method of cutting pulley-mortises in window stiles with a cutter having a cutting head of a diameter substantially equal to the width of the flange of the pulley and a cutting shank of a diameter substantially equal to the width of the body of the pulley comprising the steps of feeding the cutter axially to the depth of the flange-receiving portion of the mortise, feeding the cutter transversely at that depth to cut the flange-receiving portion, moving the cutter transversely to the center of the mortise, feeding the cutter axially through the work until the cutting head is entirely through the work, feeding the cutter transversely whereby to cause the cutting shank to cut the body-receiving portion of the mortise, moving the cutter transversely to the center of the mortise, and withdrawing the cutter axially.

13. In a mortising machine, the combination of a cutter, and means for feeding the cutter into the work comprising axial feeding mechanism, and transverse feeding mechanism including a lever and two actuating means applying force to said lever at separated points thereon, whereby one of said points acts as a movable pivot for said lever.

14. In a mortising machine, the combination of a cutter, and means for feeding the cutter into the work comprising axial feeding mechanism, and transverse feeding mechanism including a lever and two actuating means applying force to said lever at separated points thereon and in opposite directions whereby the resulting movement of said cutter is equal to the sum of the movements caused by each of said actuating means.

15. In a mortising machine, the combination of a cutter, and means for feeding the cutter into the work comprising axial feeding mechanism, and transverse feeding mechanism having a lever, an eccentric, means connecting said eccentric to said lever, a cam, and means actuated by said cam and connected to said lever.

16. In a mortising machine, the combination of a cutter, a support carrying said cutter, and means for moving the support axially and transversely of said cutter comprising axial feeding mechanism, and transverse feeding mechanism having a lever attached to said support, an eccentric, means connecting said eccentric to said lever and operable in all positions of movement of the support axially of said cutter, a cam, and means actuated by said cam connected to said lever and operable in all positions of movement of the support axially of said cutter.

17. In a mortising machine, the combination of a frame, a head mounted for movement in one direction on said frame, mechanism for moving said head in said direction, a support mounted for movement on said head transversely of the movement thereof, a cutter rotatably mounted in said support and mechanism for moving said support comprising a lever having one end attached to said support, an eccentric, means connecting said eccentric to said lever intermediate its ends, a cam, and means actuated by said cam and connected to the other end of said lever.

18. In a mortising machine, the combination of a frame, a head mounted for vertical movement on said frame, mechanism for moving said head vertically including springs operable to hold said head out of cutting position and cam means operable to move said head against the action of said springs into a cutting position, a support mounted for horizontal movement on said head, a cutter rotatably mounted in said support, and mechanism for moving said support horizontally comprising a lever attached at one end to said support, means actuated by an eccentric connected to said lever intermediate its ends, and means actuated by a cam connected to the other end of said lever.

19. In a mortising machine, the combination of a frame, a head mounted for vertical movement on said frame, mechanism for moving said head vertically, a support mounted for horizontal movement on said head, a cutter rotatably mounted in said support, and mechanism for moving said support horizontally comprising a lever having one end pivoted to said support, an eccentric, a link having a pivotal connection with said lever intermediate the ends of the latter and an adjustable connection with said eccentric to permit adjusting the stroke of said eccentric, a cam, a second lever pivoted on said frame and carrying a roller intermediate its ends actuated by said cam, and a link connecting the free ends of said levers.

20. A machine of the character described comprising, in combination, a frame, a head mounted on said frame for vertical movement, means for moving said head vertically, a support mounted on said head for horizontal movement, means for moving said support horizontally, a pair of cutter spindles mounted on said support, a driving pulley mounted on said frame, a pair of belts connecting said driving pulley with the respective spindles, said driving pulley being of sufficient length to permit the belts to shift axially thereon when the cutter spindles are moved vertically by said head, and an idler yieldingly mounted on said frame and pressing against one run of each belt to compensate for the changes of distance between the axes of the cutter spindles and the driving pulley when the cutter spindles are moved horizontally by the support.

21. A machine of the character described comprising, in combination, a frame, a vertically moving head mounted on said frame, a horizontally moving support mounted on said head, a cutter spindle mounted on said support, work feeding means mounted on said frame, a rotating shaft mounted on said frame, and three cams secured on said shaft, one of said cams for the vertical motion of the head, another of said cams for the horizontal motion of said support, and the third of said cams for feeding the work to the spindles.

22. A machine of the character described comprising, in combination, a frame, a head mounted on said frame for vertical movement, resilient means normally elevating said head, a support mounted on said head for horizontal movement, a cutter spindle mounted on said support, a cam shaft rotatably mounted on said frame, a pair of cams secured on said shaft, means operated by one of said cams for depressing said head against the action of said resilient means, and means operated by the other of said cams for moving said support horizontally.

23. The method of cutting mortises with a cutter having a cutting shank and an enlarged cutting head at its free end, comprising the steps of effecting a relative feeding motion between the cutter and the work axially of the cutter to cause the cutter to enter the work to a shallow depth, effecting a relative shifting motion of the cutter and the work in a direction transverse to the axis of the cutter to cause the cutter to form a shallow countersink in the face of the work, then effecting a relative feeding movement between the cutter and the work axially of the cutter to cause the cutter to enter the work to a depth at which the head of the cutter will be spaced a substantial distance from the bottom of said countersink, then effecting a relative movement between the cutter and the work in a direction transverse to the axis of the cutter and lengthwise of said countersink to cause the shank of the cutter to form an elongated slot, and finally effecting a relative movement of the cutter and the work to separate them.

24. The method of cutting mortises with a cutter having a cutting shank and an enlarged cutting head at its free end, comprising the steps of feeding the cutter axially into the work to a shallow depth, shifting the cutter transversely at such depth to cut a shallow countersink in the work, then shifting the cutter transversely to the middle of the countersink, then feeding the cutter axially into the work to a depth at which the head of the cutter will be spaced a substantial distance from the bottom of the countersink, then shifting the cutter transversely to cause its shank to cut an elongated slot extending in opposite directions from the center of the countersink and of narrower width than the countersink, and then withdrawing the cutter from a position centered with respect to said countersink and slot.

In testimony whereof, I have hereunto affixed my signature.

GEDOR W. ALDEEN.